(12) United States Patent
Sailer et al.

(10) Patent No.: US 10,513,343 B2
(45) Date of Patent: Dec. 24, 2019

(54) INTEGRAL PUMP PRESSURE RELIEF VALVE

(71) Applicant: Parker-Hannifin Corporation, Cleveland, OH (US)

(72) Inventors: Thomas Sailer, Amherst, OH (US); David Jonathan Sandy, Avon, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 754 days.

(21) Appl. No.: 15/211,244

(22) Filed: Jul. 15, 2016

(65) Prior Publication Data

US 2017/0037856 A1     Feb. 9, 2017

Related U.S. Application Data

(60) Provisional application No. 62/200,249, filed on Aug. 3, 2015, provisional application No. 62/294,521, filed on Feb. 12, 2016.

(51) Int. Cl.
    *B64D 37/00*        (2006.01)
    *F04D 7/02*         (2006.01)
    (Continued)

(52) U.S. Cl.
    CPC ............. *B64D 37/005* (2013.01); *F04D 7/02* (2013.01); *F04D 29/2266* (2013.01);
    (Continued)

(58) Field of Classification Search
    CPC ...... F04D 1/025; F04D 13/02; F04D 15/0011; F04D 15/0005; F04D 15/0083;
    (Continued)

(56) References Cited

U.S. PATENT DOCUMENTS

| 2,384,254 | A | * | 9/1945 | Meredew | ............. | F02M 37/103 |
| | | | | | | 417/424.1 |
| 2,402,398 | A | * | 6/1946 | Harpster | ................ | F02M 37/04 |
| | | | | | | 415/143 |

(Continued)

*Primary Examiner* — Dwayne J White
*Assistant Examiner* — Wayne A Lambert
(74) *Attorney, Agent, or Firm* — Renner, Otto, Boisselle & Sklar, LLP

(57) ABSTRACT

A fuel pump includes a cartridge removably received within a canister. The cartridge includes a motor assembly, and a pump assembly that includes a centrifugal pumping element and outlet porting from the centrifugal pumping element. The motor drives the centrifugal pumping element to generate a flow of fluid through a main flow pathway between a pump inlet and outlet through the outlet porting of the pump assembly. The cartridge further includes a pressure relief valve that is movable between a closed position and an open position, and defines a pressure relief flow pathway integrally within the cartridge from the outlet porting to inlet porting of the centrifugal pumping element. When pressure within the pump assembly exceeds a threshold pressure, the pressure relief valve moves from the closed position to the open position to permit a relief flow of fluid through the relief flow pathway. The fuel pump may be employed as part of an aircraft fuel system.

22 Claims, 6 Drawing Sheets

(51) Int. Cl.
*F04D 29/42* (2006.01)
*F04D 29/60* (2006.01)
*F04D 29/22* (2006.01)

(52) U.S. Cl.
CPC ..... *F04D 29/2277* (2013.01); *F04D 29/4293* (2013.01); *F04D 29/605* (2013.01); *F04D 29/606* (2013.01)

(58) Field of Classification Search
CPC .. F04D 27/0207; F04D 27/0215; F04D 29/22; F04D 29/605; F04D 29/606; F04D 29/688; F04D 29/2277; F04D 29/2266; F04D 29/4293; F04D 7/02; B64D 37/005
See application file for complete search history.

(56) References Cited

U.S. PATENT DOCUMENTS

| | | | | |
|---|---|---|---|---|
| 2,470,565 A * | 5/1949 | Loss | | F04D 27/0207 415/11 |
| 2,660,384 A * | 11/1953 | Smith | | F04D 29/606 137/38 |
| 2,978,150 A * | 4/1961 | Doelcher | | B64D 37/16 222/333 |
| 3,070,025 A * | 12/1962 | Cliborn | | F04D 15/0011 415/11 |
| 3,172,365 A * | 3/1965 | Nasvytis | | F02M 37/103 417/360 |
| 3,369,715 A * | 2/1968 | Carter | | F04D 9/00 222/333 |
| 3,486,458 A * | 12/1969 | Tyler | | F02C 7/22 415/28 |
| 3,539,272 A * | 11/1970 | Howard | | F02M 37/103 222/333 |
| 3,836,291 A * | 9/1974 | Bottcher | | F02M 37/048 415/216.1 |
| 3,876,120 A * | 4/1975 | Haesloop | | F04D 13/16 222/333 |
| 3,910,715 A * | 10/1975 | Yedidiah | | F04D 29/2277 138/39 |
| 3,976,390 A * | 8/1976 | Silvern | | F04D 27/0215 415/58.1 |
| 3,977,809 A * | 8/1976 | Petit | | F04B 49/04 415/29 |
| 4,013,053 A | 3/1977 | Dinkelkamp et al. | | |
| 4,080,106 A * | 3/1978 | Haesloop | | F04D 29/086 222/333 |
| 4,275,988 A * | 6/1981 | Kalashnikov | | B01F 7/081 415/143 |
| 4,318,667 A * | 3/1982 | Miller | | F04D 29/608 415/121.3 |
| 4,324,532 A * | 4/1982 | Knife | | F02M 37/08 222/333 |
| 4,834,621 A * | 5/1989 | Hall | | F04D 9/006 137/217 |
| 4,964,783 A * | 10/1990 | Haverkamp | | F04D 29/669 415/119 |
| 5,061,151 A * | 10/1991 | Steiger | | F04D 9/041 415/106 |
| 5,408,708 A * | 4/1995 | Mathis | | A61H 33/0087 4/541.1 |
| 5,762,049 A * | 6/1998 | Jones | | F02M 37/10 123/509 |
| 5,795,127 A * | 8/1998 | DeClerck | | F04D 9/02 415/106 |
| 6,099,263 A | 8/2000 | Bodzak et al. | | |
| 6,328,538 B1 | 12/2001 | Rademacher | | |
| 6,517,309 B1 * | 2/2003 | Zaher | | F04D 29/669 415/1 |
| 7,025,557 B2 | 4/2006 | Japikse et al. | | |
| 2001/0011538 A1 * | 8/2001 | Crary | | B60K 15/035 123/509 |
| 2013/0320148 A1 * | 12/2013 | Lewis | | F04D 1/025 244/135 R |

* cited by examiner

INTEGRAL PUMP PRESSURE RELIEF VALVE

FIELD OF INVENTION

The present invention relates generally to cartridge/canister fuel pumps, and more particularly to pressure relief elements in such fuel pumps. In some cartridge/canister fuel pumps, centrifugal pump systems are used with a pressure relief valve that responds to changes in discharge flow rates and resultant pressure within the pump assembly.

BACKGROUND

Cartridge/canister fuel pumps constitute an integrated fuel pump system that permits installation and removal of the cartridge from the canister as a unit. A typical use of cartridge/canister fuel pumps is for aircraft fuel systems.

Aircraft fuel pumps generally are fuel tank mounted. In one configuration, the fuel pump may be installed entirely inside the fuel tank. Alternatively, the fuel pump may penetrate the fuel tank wall with part of the pump, the canister, being mounted inside the fuel tank and part of the pump, the cartridge or a portion thereof, passing through a penetration in the fuel tank between inside and outside of the fuel tank with an inside connection to the canister. The canister generally contains fluid connections and related fluid pathways, and various valves (e.g., check valves, service shutoff valves, pressure relief valves, pressure regulating valves, or sequence valves) for controlling the fuel flow. The cartridge generally contains a motor, bearings, and the pumping components, which tend to be more subject to wear as compared to the canister components. The cartridge/canister configuration is preferred in many applications since wear components of the cartridge can be removed and replaced without draining or entering the fuel tank. Fuel tank mounted fuel pumps generally utilize centrifugal pumping elements which typically are either radial or mixed flow type impellers.

A typical pump performance requirement includes a minimum pressure at a specific flow rate. In some fuel systems, pump output pressure at reduced flow rates is limited to a predetermined maximum or threshold value, thus resulting in minimum and maximum pressure requirements. Frequently, the performance characteristic of a centrifugal pump results in increasing pressure at flow rates below the required flow rate. Accordingly, to stay below the maximum threshold pressure requirement, a pressure relief valve is utilized to route pump discharge flow to a tank or to the pump inlet resulting in reduced output pressure.

A conventional approach for pressure relief has been to extend the fuel flow pathway to a spring loaded pressure relief valve that tends to be external to the cartridge. As a result, the discharge flow has to travel a substantial distance to be upstream of the impeller to cycle the excess discharge flow back into the impeller inlet. To accommodate such an extended flow configuration, significant extra plumbing is required. The extra plumbing increases the size, weight, and number of components of the fuel pump. Particularly for aircraft, which may have as many as eight or more cartridge/canister fuel pumps (depending upon the particular aircraft model), the extra size and weight negatively affects fuel efficiency and performance of the aircraft. Conventional pressure relief systems, therefore, have been deficient.

SUMMARY OF INVENTION

The present invention provides a cartridge/canister fuel pump with a pressure relief valve that overcomes the deficiencies of conventional configurations. To avoid reaching excess pressure above a predetermined threshold pressure requirement, the pressure relief valve is used to route pump discharge flow directly to the pump inlet, which results in reduced output pressure. The pressure valve is integral to the cartridge assembly and guides the discharge flow from the downstream portion of the impeller directly to the upstream portion of the impeller without directing the discharge flow through extra plumbing. The integral pump pressure relief valve thus ensures that the maximum threshold pressure is not reached, without using the extra plumbing and a pressure relief valve external to the cartridge as is typical of conventional configurations.

In exemplary embodiments, the pressure relief valve includes a movable element that is biased by an elastic element that allows the valve to open when the discharge pressure is too high or above a predetermined threshold. In particular, when the pressure rises above a predetermined threshold pressure, the movable element moves axially under the excess pressure against the bias of the elastic element, to open just enough to permit a discharge flow through the valve. The discharge flow relieves the excess pressure. In addition, the discharge flow proceeds from the downstream portion of the centrifugal pumping element directly to the upstream or inlet portion of the centrifugal pumping element through relief porting that defines a small channel within the pump assembly.

The movable element may be a configured as a valve disc that is biased by springs in a first closed position. The valve disc moves from the first biased position to a second open position by moving axially under the excessive pressure to open a discharge flow channel for a relief flow between the outlet of the centrifugal pumping element and the inlet of the centrifugal pumping element. In exemplary embodiments, the centrifugal pumping element may be configured as a two stage element including an upstream inducer and a downstream impeller that in combination generate the fuel flow. In such a two stage configuration, the discharge relief flow flows from an outlet of the impeller directly to an inlet of the inducer. A throat that houses the inducer further may be configured as a housing to guide the springs with either pins or comparable guiding structures. Compared to conventional configurations in which the discharge flow has to travel a farther distance through extra plumbing to be upstream of the impeller, the integral pump pressure relief valve of the present invention significantly reduces the distance for the discharge flow to travel upstream of the impeller.

An aspect of the invention is a cartridge/canister fuel pump. In exemplary embodiments, the fuel pump includes a cartridge and a canister, the canister being configured to removably receive the cartridge, and the canister includes an inlet and an outlet for the flow of a fluid through the cartridge/canister fuel pump. The cartridge includes a motor assembly and a pump assembly, the pump assembly including a centrifugal pumping element and outlet porting from the centrifugal pumping element, wherein the motor drives the centrifugal pumping element to generate a flow of fluid through a main flow pathway between the inlet and the outlet through the outlet porting of the pump assembly. The cartridge further includes a pressure relief valve that is movable between a closed position and an open position, the pressure relief valve defining a pressure relief flow pathway integrally within the cartridge from the outlet porting to inlet porting of the centrifugal pumping element. When pressure within the pump assembly exceeds a threshold pressure, the pressure relief valve moves from the closed position to the open position to permit a relief flow of fluid through the relief flow pathway.

The pressure relief valve may include: a movable element, such as a valve disc or a valve poppet that is movable between the closed position against a valve seat and the open position spaced apart from the valve seat; an elastic element, such as one or more springs, that biases the movable element in the closed position; and at least one relief port that fluidly connects the outlet porting and the inlet porting of the centrifugal pumping element. When pressure within the pump assembly exceeds the threshold pressure, the movable element moves from the closed position to the open position to permit the relief flow of fluid from the outlet porting, through the relief port, to the inlet porting of the centrifugal pumping element.

The fuel pump may be employed as part of an aircraft fuel system including multiple fuel tanks, including wing tanks within the wings of the aircraft and a center tank within the fuselage of the aircraft. Each fuel pump may be mounted to a fuel tank wall such that a portion of the cartridge extends through the fuel tank wall, which permits removing the cartridge without having to access any internal tank components.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
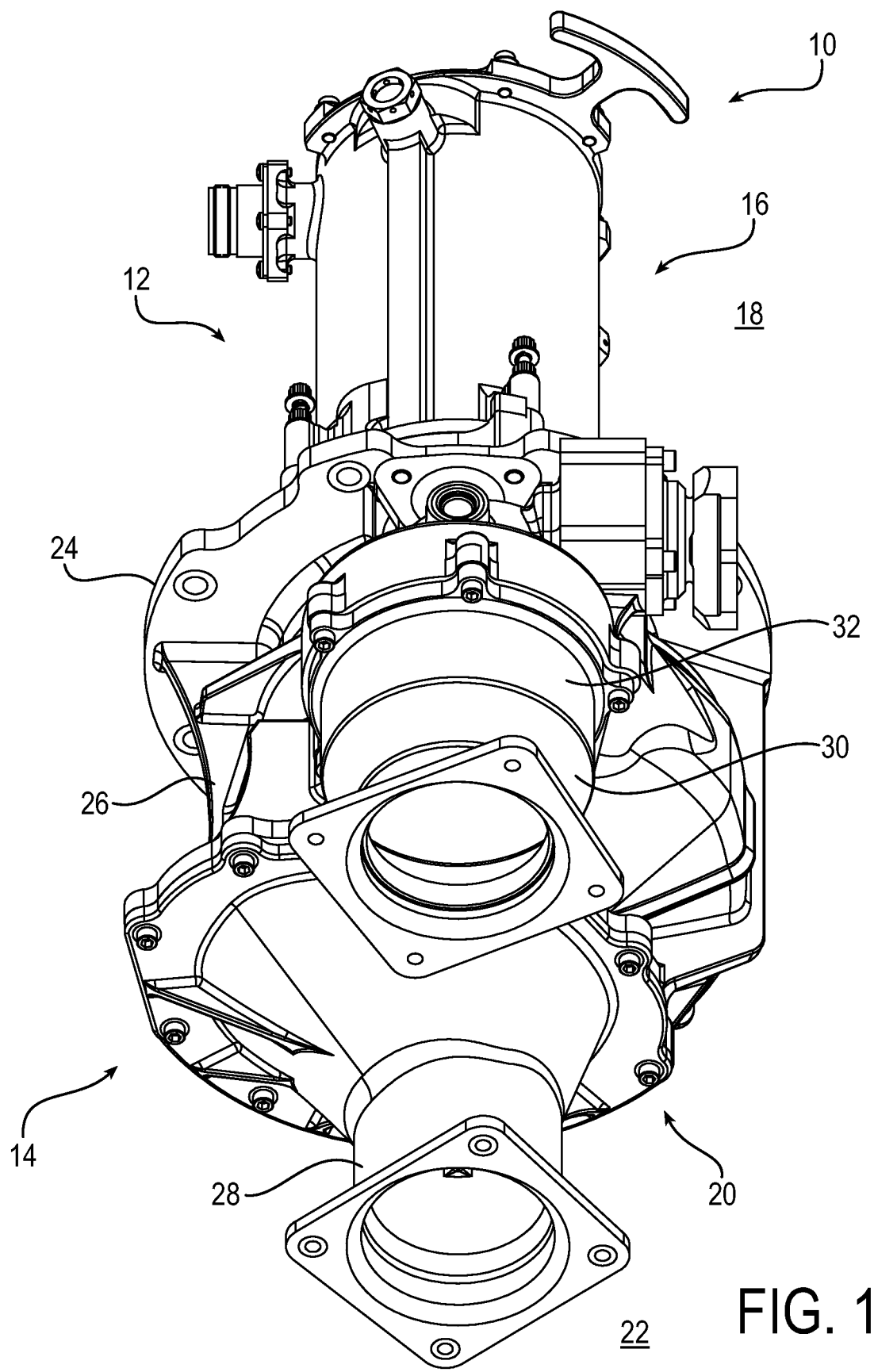
FIG. 1 is a drawing depicting an isometric view of an exemplary cartridge/canister fuel pump in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting an isometric view of an exemplary cartridge/canister fuel pump 10 in accordance with embodiments of the present invention. The cartridge/canister fuel pump 10 includes a cartridge 12 that is inserted into and extends from a canister 14. The cartridge/canister fuel pump 10 further may be characterized as having a first or outside portion 16 located within an outside region 18, and a second or inside portion 20 located within an inside region 22. The outside and inside regions are separated by a mounting plate that attaches to the pump canister flange 24. In practice, the cartridge/canister fuel pump 10 may be mounted to a wall of a fuel tank via the flange 24 being fixed to the fuel tank wall. With such mounting, the first portion 16 is located outside of the fuel tank (the outside region 18 is located outside the fuel tank) and the second portion 20 is located inside of the fuel tank (the inside region 22 is located inside the fuel tank).

As further detailed below, the cartridge 12 generally includes a motor, bearings, and the pumping elements, which extend from the outside region 18, through the mounting plate and canister flange 24, and into the inside region 22. In other words, the components of the cartridge 12 span across the canister flange 24 such that some of the cartridge components are part of the outside portion 16 of the cartridge/canister fuel pump 10, and some of the cartridge components are part of the inside portion 20 of the cartridge/canister fuel pump 10. With such configuration, a maintenance person can remove and replace the cartridge and its associated components with sole access from the outside region 18 without having to drain or enter the fuel tank.

The canister 14 generally may include fluid connections and various valves for communicating a flow of fuel from the fuel tank to downstream engine components. For example, as seen in FIG. 1, the canister 14 may include a volute housing 26 that houses the various pumping components of the inserted cartridge. The canister 14 further may include an inlet cover 28 defining an inlet for fuel to enter the pumping elements from the fuel tank, and a discharge cover 30 defining an outlet for communicating fuel from the pump to the downstream engine components. The canister 14 further may include a check valve 32 mounted in the volute housing 26 on the outlet side of the pumping elements for a more generalized control of the fuel flow.

Figure 2:
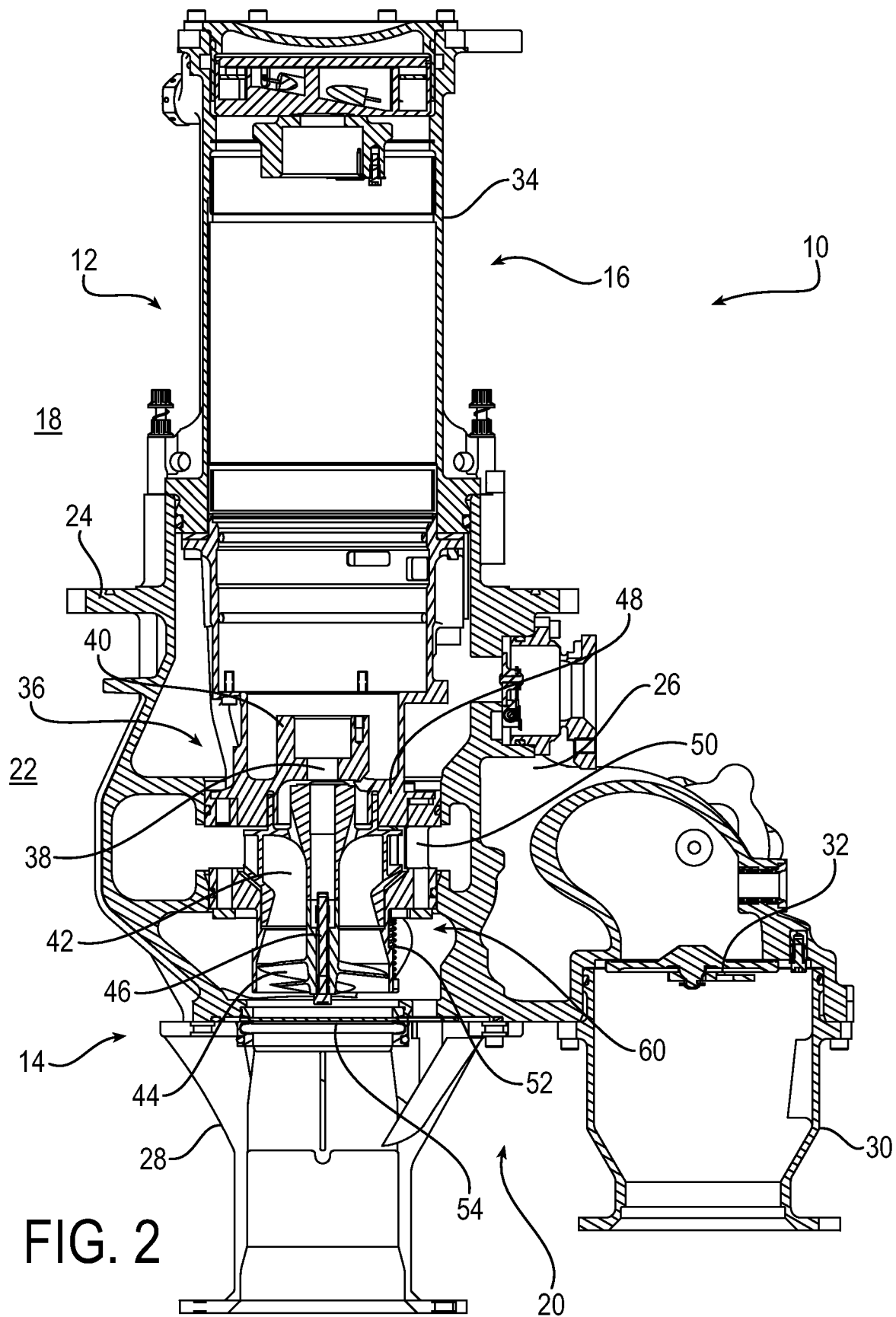
FIG. 2 is a drawing depicting a cross-sectional view of the exemplary cartridge/canister fuel pump of FIG. 1 in accordance with embodiments of the present invention.

FIG. 2 is a drawing depicting a cross-sectional view of the exemplary cartridge/canister fuel pump 10 of FIG. 1 in accordance with embodiments of the present invention. Accordingly, like reference numerals are used in FIG. 2 as in FIG. 1 for like components. With the cross-sectional view of FIG. 2, the inner components of the cartridge/canister fuel pump 10 are shown. As described in connection with FIG. 1, as also shown in FIG. 2 region 18 represents an outside region external to the fuel tank, and region 22 represents an inside region internal to the fuel tank. The inside and outside regions are separated by the canister flange 24, which is used to mount the cartridge/canister fuel pump 10 with a mounting plate to the fuel tank wall. In this manner, an outside portion 16 of the cartridge 12 is in the outside region 18 so as to permit external access to the canister for easy removal and replacement.

The cartridge 12 may include a motor assembly 34 and a pump assembly 36, the motor assembly 34 being configured to drive the pumping elements of the pump assembly 36. The motor assembly 34 may be considered part of the outside portion 16 of the fuel pump 10, insofar as the motor assembly extends to the outside region 18 external to the fuel tank. Similarly, the pump assembly 36 may be considered part of the inside portion 20 of the fuel pump 10, insofar as the pump assembly is located within the inside region 22 internal within the fuel tank. The motor assembly 34 may be configured as an AC electric motor or any other suitable motor used for fuel pumps as are known in the art. The motor assembly 34 in particular may drive rotation of a rotating shaft component of the pump assembly 36. The rotation of the shaft may be steadied by a ring element 40 that is fixed to the shaft, and may be supported by other associated bearings and support structures as part of the pump assembly 36 as is known in the art.

The pump assembly 36 further may include one or more centrifugal pumping elements. In the example of FIG. 2, the centrifugal pumping element is configured as a two stage pumping element including an impeller 42 and an inducer 44. The impeller 42 is fixed to the shaft 38. An extension rod 46 also is fixed to an end of the shaft 38, and the inducer 44 in turn is fixed around the extension rod. In this manner, the rotation of shaft 38 as driven by the motor assembly 34 is imparted to the impeller 42 and the inducer 44. Blades on the impeller and inducer drive a fuel flow from the inlet to the outlet side of the cartridge/canister fuel pump 10 as further described below. A pump housing 48 houses the impeller and defines outlet porting 50 that permits an outlet flow of fuel from the impeller through an outlet path in the volute housing 26, and out through the discharge cover 30. The inducer is housed in a throat 52, which is mounted to the pump housing 48. The combined use of an inducer with an impeller provides for an enhanced flow, as the two stages cooperate in driving the fuel flow. In an alternative embodiment, the centrifugal pumping element may be configured as a one stage pumping element including only the impeller 42, depending on the flow needs of the system.

As referenced above, the canister 14 may include the volute housing 26 that houses the various pumping components of the inserted cartridge 12. The canister 14 further may include the inlet cover 28 defining an inlet for fuel to enter the pumping elements from the fuel tank. The inlet cover 28 may house a gate valve 54 that is configured to act as a shutoff valve to isolate the pumping components from the fuel tank when the pump is not in operation. In addition, the discharge cover 30 defines the outlet for communicating fuel from the pump to the downstream engine components, with control through the outlet further being controlled with an additional check valve 32 set at the boundary between the volute housing 26 and the discharge cover 30.

The cartridge/canister fuel pump 10 operates generally as follows. When the motor assembly 34 is actuated to drive the rotating shaft 38, the rotating shaft imparts rotation to the centrifugal pumping elements including the impeller 42 and the inducer 44. The rotation of the centrifugal pumping elements creates a forward flow pressure differential. The fuel flow is driven from the inducer to the impeller through flow paths defined by the throat 52, and out through the outlet porting 50 of the pump housing 48 adjacent to the centrifugal pumping element, and further into and through the outlet pathway in the volute housing 26. The fuel flow continues through the discharge cover 30 to be provided to the downstream engine components. In normal operation, the described fuel flow from the impeller through the discharge cover may be referred to as a main flow pathway.

The present invention pertains to a pressure relief valve that relieves pressure if the pressure in the cartridge/canister fuel pump 10, and particularly within the pump assembly 36, exceeds a maximum predetermined threshold amount. Excess pressure may be undesirable for the following reasons:
 1. The system plumbing may have pressure limitations based on structural capabilities.
 2. The system may be configured so other pumps operating at the same time within the same system will always have higher discharge pressure to control transfer rates from specific regions.

Figure 3:
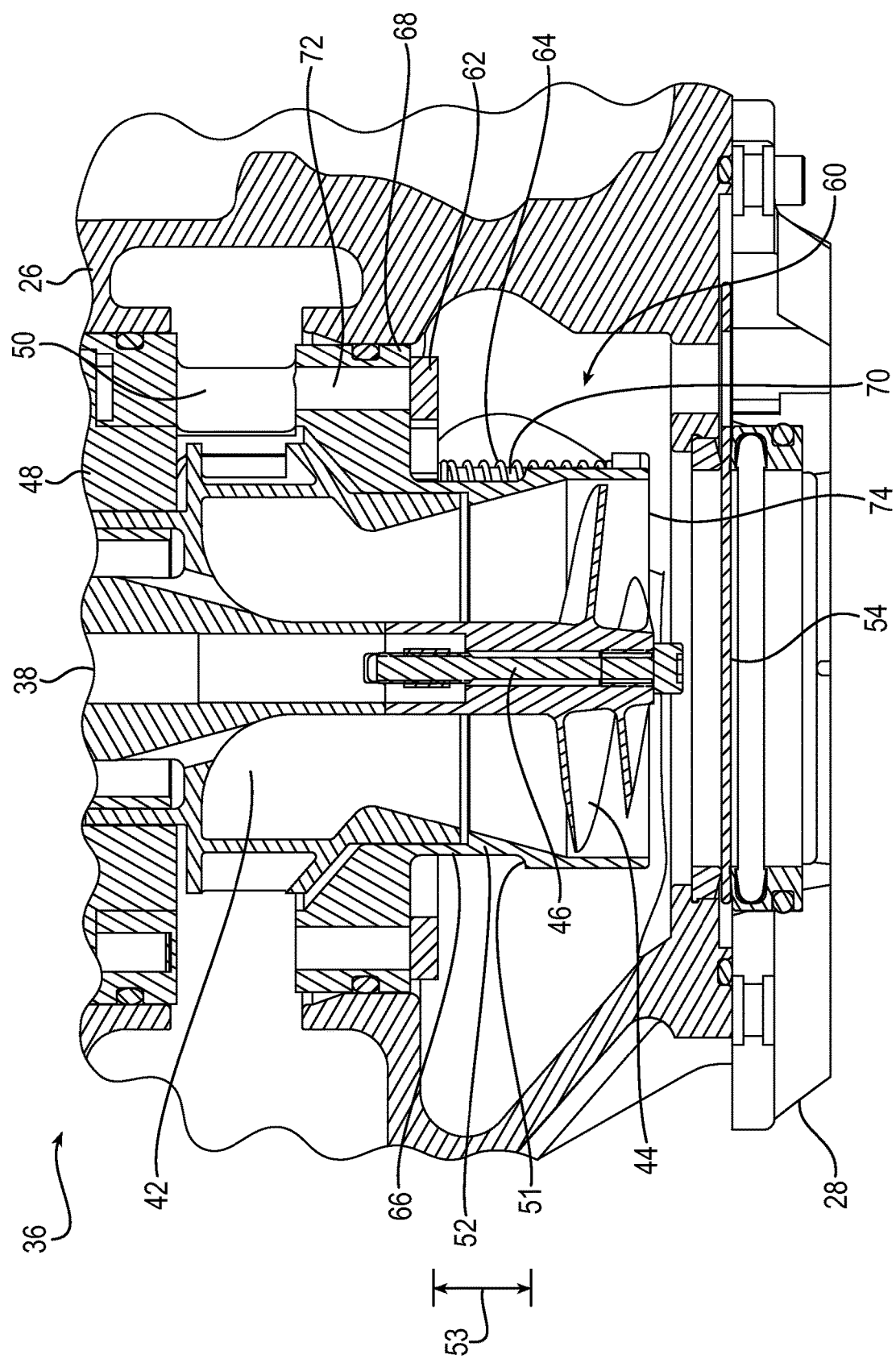
FIG. 3 is a drawing depicting a side cross-sectional view of a portion of the cartridge/canister fuel pump of FIG. 2, such portion including an exemplary pressure relief valve in accordance with embodiments of the present invention.

A pressure relief valve is identified generally in FIG. 2. by reference numeral 60. FIG. 3 is a drawing depicting a side cross-sectional view of a portion of the cartridge/canister fuel pump 10 of FIG. 2 essentially in the region of the pump assembly 36, such portion showing in more detail the components of the exemplary pressure relief valve 60 in accordance with embodiments of the present invention.

The pressure relief valve 60 may include a movable element 62 that is biased by an elastic element 64. In exemplary embodiments, the movable element 62 may be configured as a valve disc that is shaped as an annular ring that extends around an outer diameter 66 of the throat 52. In addition, the valve disc 62 may be biased in a first position against a valve seat 68 formed as an outer surface of the pump housing 48. The elastic element 64 may be configured as one or more springs. Each of the springs 64 may be coiled around a respective support pin 70. The pump housing 48 further may define one or more relief ports 72 that are in fluid communication with the outlet porting 50 that constitutes the outlet pathway from the centrifugal pumping element (i.e., impeller 42). In the first biased position under normal operating pressures, the elastic element (springs) 64 biases the movable element (valve disc) 62 against the seat 68 to close off and seal the relief ports 72. FIG. 3 illustrates the pressure relief valve 60 with the movable element in the first position corresponding to a biased position against the valve seat 68. The movable element 62 is movable from the first position to a second position corresponding to an open position to open the pressure relief valve.

The pressure relief valve 60 operates as follows. In the event of a buildup of excessive pressure above a maximum predetermined threshold within the pump assembly 36, the excess pressure causes the movable element (valve disc) 62 to move off the seat 68 from the first biased position against the seat 68 to the second open position spaced apart from the seat 68. For example, the valve disc 62 may move off the seat 68 axially along the outer diameter 66 of the throat 52, against the biasing force of the springs 64. The support pins 70 may include a stepped diameter that defines a stroke space 53 for the movable element (valve disc) 62. The movement of the movable element is guided along the outer diameter 66 of the throat 52, through the stroke space 53, until the movement is stopped by a contact of the valve disc against the stepped diameter 51 of the guide pin 70 constituting the second open position. In other words, the stroke space 53 is defined by the axial edge of the valve disc 62 when in the first or closed position, and the stepped diameter 51 that acts as a stop for the movement of the valve disc 62.

The axial movement of the movable element 62 off of the seat 68 opens the relief ports 72. A portion of the discharge fuel flow from the impeller, therefore, can now flow under the excess pressure from the outlet porting 50 adjacent the impeller through the relief ports 72. The discharge flow then may proceed around the throat 52, and be pulled back into an inducer inlet porting 74 of the inducer 44. The discharge flow through porting 50, 72, 74 and back to the inducer 44 is referred to herein as a "relief flow pathway". Accordingly, the relief flow pathway extends from the outlet porting 50 from the impeller 40 through the relief ports 72 and back via the inducer inlet 74 to the inducer 44. The relief flow pathway essentially from the impeller outlet directly back to the inducer inlet provides for pressure relief from the excess pressure. When the pressure falls below the predetermined threshold, the biasing force of the elastic element 64 becomes dominant over the pressure force, and the movable element 62 returns to the first biased position against the seat 68, thereby closing off the relief ports 70. Fuel flow, therefore, then proceeds under the normal operation solely along the main flow pathway to the outlet 30 as described above.

With such a configuration, the pressure relief valve 60 and the associated relief flow pathway is integral within the components of the pump assembly 36. The relief flow pathway in particular is essentially a direct flow pathway from impeller 42 back to the inducer inlet 74 of the inducer 44, through the ports 50 and 72 and 74. The direct flow of the relief flow pathway of the present invention thus avoids deficiencies of conventional configurations. Compared to conventional configurations in which the discharge flow has to travel a farther distance from the cartridge through extra plumbing to be upstream of the impeller, the integral pump pressure relief valve of the present invention significantly reduces the distance for the discharge flow to travel upstream of the impeller. The extra plumbing of the conventional configuration is therefore eliminated by the present invention. Resultant advantages of the present invention include reduced weight and related reduced costs, and an associated reduced number of parts that can improve reliability. The integral pressure relief valve further eliminates the potential for external leakage past the pressure regulating relief valve when removing the pump cartridge from the canister, which can be an issue when the pressure relief function is performed with the extra plumbing external to the pump components of the cartridge, within the canister.

Another significant advantage of the present invention is that a potential for unstable pressure surges is reduced. In conventional configurations, the pressure relief function can operate to induce pressure overshoots and under-pressure cycling, which manifests as undesirable pressure pulsations within the system. The pressure pulsations can undermine flow efficiency. By locating the pressure relief valve much closer to the centrifugal pumping element (impeller and inducer), thereby reducing the recirculation distance of the relief discharge flow, the propensity for the pressure deviations that cause the pressure pulsations is substantially reduced.

The configuration of the pressure relief valve of the present invention has proven to be particularly suitable for wing tank fuel pumps in aircraft. Wing tank pumps tend to operate at lower pressures as compared to the center fuel tank pumps, and thus the pressure relief function tends to be more important for the wing tank pumps. The present invention, however, is not limited to wing tank pumps, but may be used as well for the center tank pumps, although a larger pump typically would be required for the center tank. More generally, the pressure relief valve of the present invention may be employed in any suitable fuel system in which a pressure relief function within the fuel pump is desirable.

Figure 4:
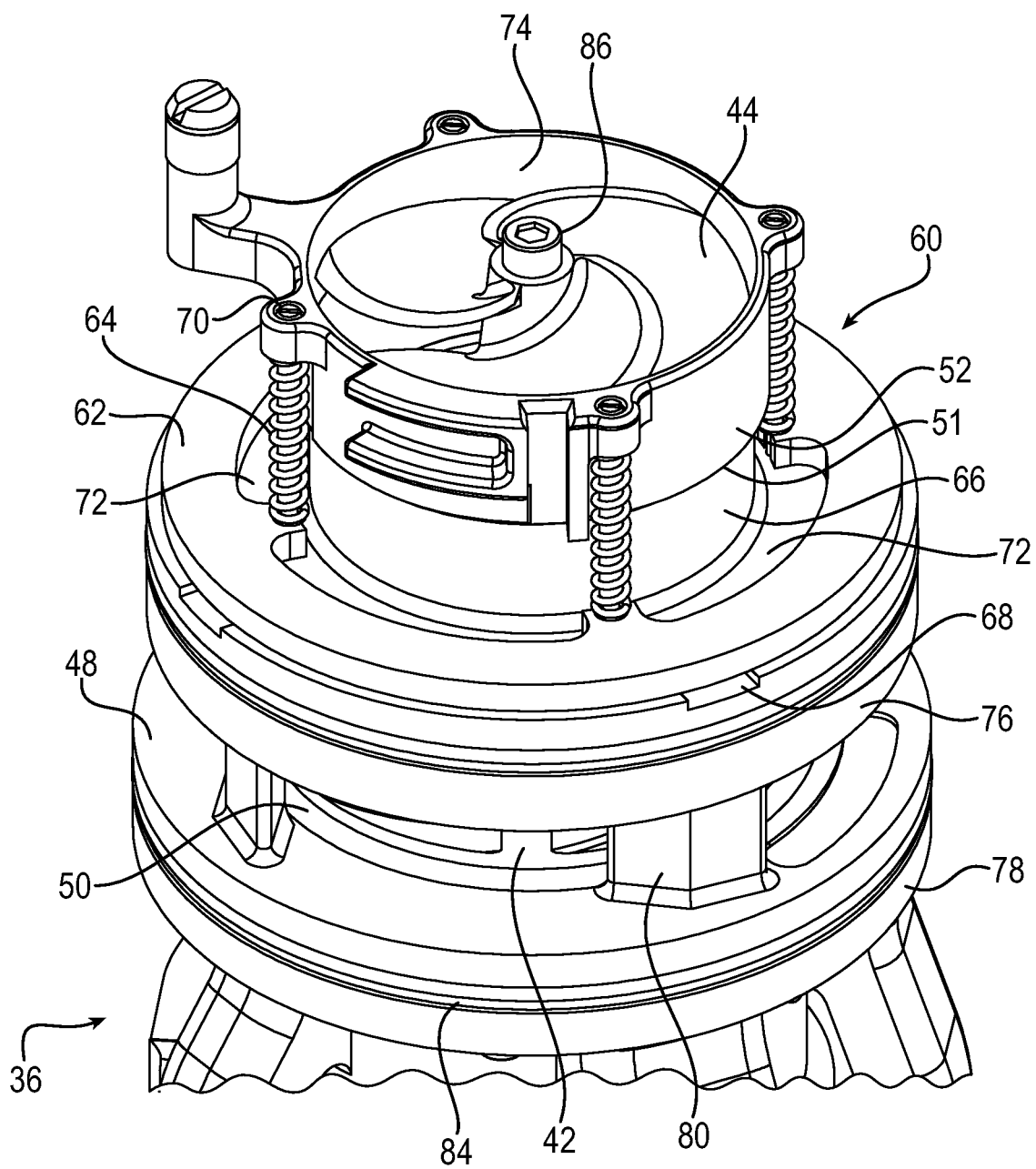
FIG. 4 is a drawing depicting an isometric view of the same portion of the cartridge/canister fuel pump of FIG. 3, such portion including the exemplary pressure relief valve.

FIG. 4 is a drawing depicting an isometric view of the same portion of the cartridge/canister fuel pump of FIG. 3 essentially in the region of the pump assembly 36, such portion including the exemplary pressure relief valve 60. FIG. 4 illustrates in more detail the stacked configuration of the pump components in the portion containing the pressure relief valve 60. The pressure relief valve 60 includes the movable element or valve disc 62 biased by the elastic element 64 configured in this example as a plurality of springs. The valve disc 62 extends around an outer diameter 66 of the throat 52. In addition, the valve disc 62 is biased against the seat 68 formed as an outer surface of the pump housing 48. The elastic element 64 may be configured as one or more springs. In this example, the elastic element includes four springs spaced equidistantly around the outer diameter 66 of the throat 52. Each of the springs 64 is coiled around a respective support pin 70. It will be appreciated that the precise number of springs may be varied as is suitable for a particular application.

The pump housing 48 further defines the outlet porting 50 for the communication of the fuel flow from the impeller 42. The pump housing 48 may be characterized as being formed by a first housing component 76 and a second housing component 78. The first housing component 76 includes the seat 68, and the second housing component acts as a base for the other components of this portion of the pump assembly. A plurality of supports 80 connect the first and second housing components to form a frame so as to define the porting 50. It will be appreciated that the precise number of supports and more generally the support and frame configuration may be varied as suitable for a particular application, so long as an adequate output flow path from the impeller is formed. A sealing element 84, such as an o-ring or comparable seal, may be provided to seal against the inner frame 82 adjacent to the impeller 42.

The relief ports 72 from FIG. 3 are under the disk and not visible in FIG. 4, the relief ports also being defined by the pump housing 48 and are in fluid communication with the outlet porting 50 that constitutes the relief flow pathway from the impeller 42. In the example of FIG. 4, the relief ports under the disc are configured as a plurality of kidney ports that extend through the seat 68 to define a channel as the relief flow pathway, and are generally spaced equidistantly around the seat 68. It will be appreciated that the precise number and shape of the relief ports may be varied as suitable for a particular application. FIG. 4 illustrates the first biased position under normal operating pressures, in which the springs 64 bias the valve disc 62 against the seat 68 to close off and seal the relief ports. The centrifugal pumping element may be secured to the shaft 38 in part using a cap 86. In the example of a two-stage configuration as depicted in the figures, the cap 86 is provided on the end of the shaft 38 adjacent to the inducer 44.

As described above, in the event of a buildup of excess pressure above a maximum predetermined threshold within the pump assembly 36, the excess pressure causes the valve disc 62 to move off the seat 68 from the first biased position, generally moving off the seat 68 axially along the outer diameter 66 of the throat 52, against the biasing force of the springs 64. As evident from FIG. 4, with such axial movement the valve disc movement is guided along the pins 70 from the seat 68 toward the opposite end of the throat 62 adjacent the inducer 44 until the valve disc has reached the second open position, with the movement of the valve disc 62 being limited by steps in the guide pins 70.

The axial movement of the valve disc off of the seat 68 thus opens the relief ports 72. A portion of the discharge fuel flow, therefore, can now flow under the excess pressure through the relief flow pathway from the outlet porting 50 defined by the supports 80 adjacent the impeller through the relief ports 72. The discharge flow then may proceed around the throat 52, and be pulled back into the inducer inlet 74 of the inducer 44. The discharge flow through the relief flow pathway and back to the inducer provides for pressure relief from the excess pressure. When the pressure falls below the predetermined threshold, the biasing force of the springs 64 becomes dominant over the pressure force, and the valve disc 62 returns to the first biased position against the seat 68, thereby closing off the relief ports 72. Fuel flow, therefore, then proceeds under the normal operation solely along the main flow pathway. In this manner, the pressure relief valve 60 is integral with the components of the pump assembly 36, and provides essentially a direct flow pathway from impeller 42 back to the inducer inlet 74 of the inducer 44, through the ports 50 and 72 that define the relief flow pathway.

Figure 5:
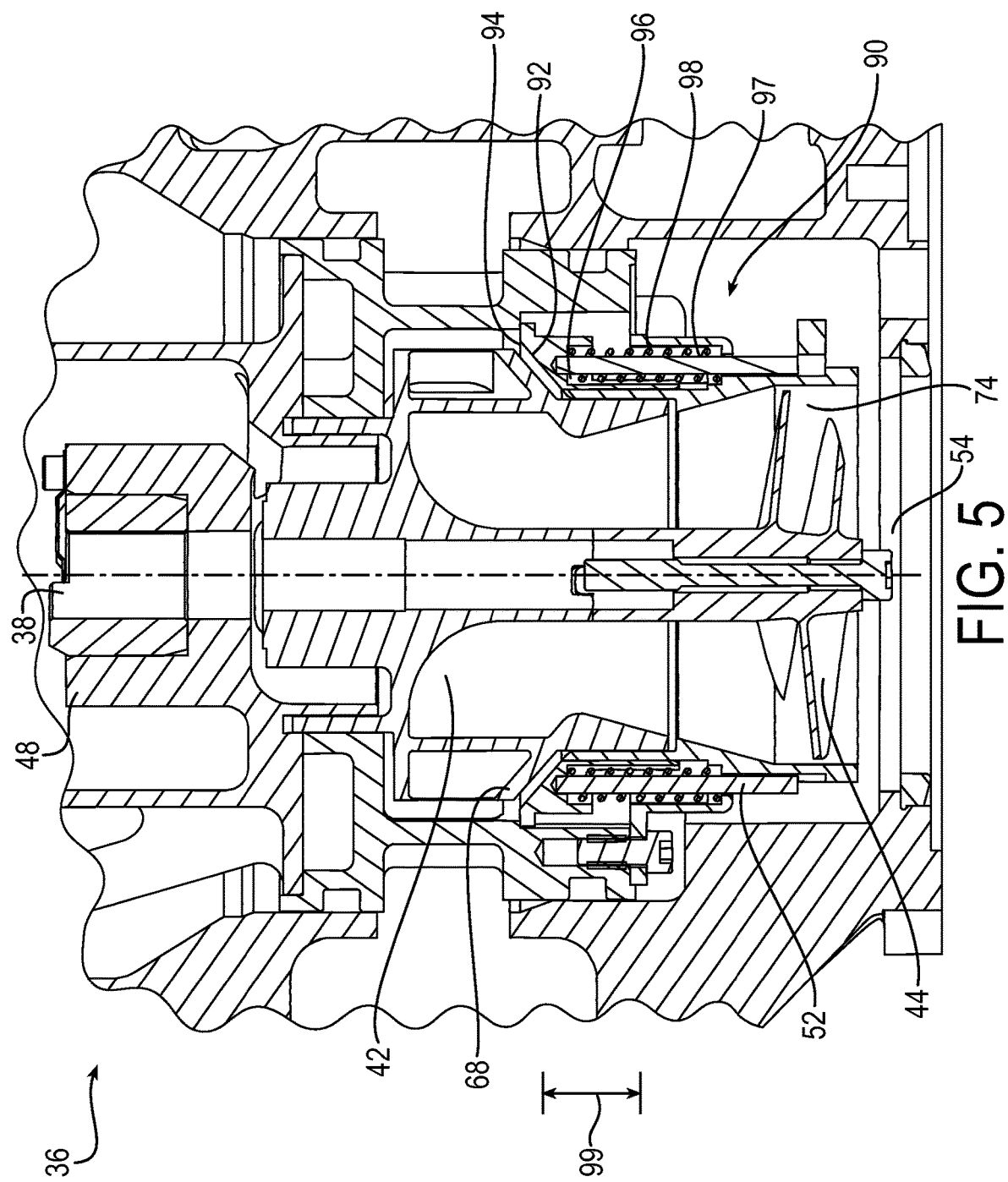
FIG. 5 is a drawing depicting a side cross-sectional view of a portion an cartridge/canister fuel pump, such portion including another embodiment of an exemplary pressure relief valve in accordance with embodiments of the present invention.

FIG. 5 is a drawing depicting a side cross-sectional view of the portion an cartridge/canister fuel pump, such portion including another embodiment of an exemplary pressure relief valve 90. The pressure relief valve 90 generally differs from the pressure relief valve 60 in the configuration of the movable element and the elastic element. In the example of FIG. 5, the movable element is configured as a valve poppet 92 including a base 94 and an axial guide 96 that extends from the base 94. The valve poppet 92 is spring loaded by springs 97 that bias the base 94 of the valve poppet against the valve seat 68 in a manner comparable to the previous embodiment. The throat 52 may include a ridge 98 that defines a stroke space 99 for movement of the valve poppet 92. In response to the excess pressure, the valve poppet 92 moves off the seat 68 from the biased first position to the second open position. In the example of FIG. 5, and the movement of the valve poppet via the axial guide 96 is guided along the outer diameter of the throat 52, through the stroke space 99 until the movement is stopped by a contact of the axial guide 96 against the ridge 98 of the throat 52 constituting the second open position. At such position, the porting opens comparably as in the previous embodiment to provide a relief flow pathway for a direct discharge flow from the impeller 42 to the inlet 74 of the inducer 44.

Figure 6:
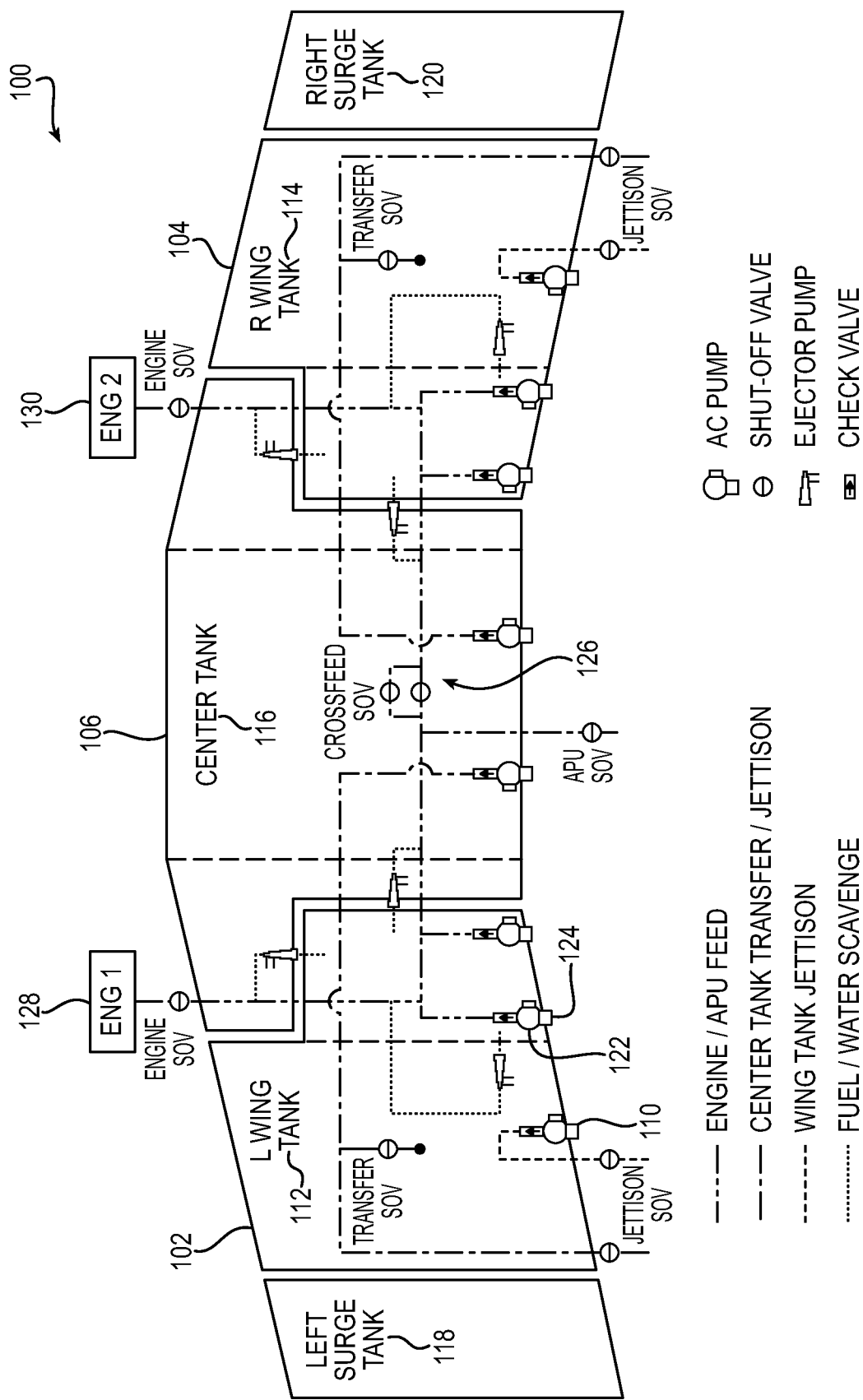
FIG. 6 is a drawing depicting a schematic of an aircraft portion constituting an aircraft fuel system including multiple exemplary cartridge/canister fuel pumps in accordance with embodiments of the present invention.

FIG. 6 is a drawing depicting an aircraft 100, with particular depiction of the components of an aircraft fuel system. The aircraft 100 may include other components (not shown) not associated with the fuel system as are conventional and known in the art. The aircraft 100 may include multiple exemplary cartridge/canister fuel pumps 110 in accordance with embodiments of the present invention. Each of the cartridge/canister fuel pumps 110 may be configured in accordance with any of the embodiments described herein.

The example aircraft 100 of FIG. 6 may include a left wing 102 and a right wing 104 joined on opposite sides to a center fuselage 106. The left wing may house a left wing fuel tank 112, the right wing may house a right wing fuel tank 114, and the fuselage may house a center fuel tank 116. Additional fuel tanks of the system further may include left and right side surge tanks 118 and 120 to provide for additional or emergency fuel needs if warranted.

It will be appreciated that the precise number and positioning of the cartridge/canister fuel pumps 110 may be varied as suitable for any particular aircraft or other application. In the example of FIG. 6, a total of eight cartridge/canister fuel pumps 110 are provided, with three being provided on each wing tank and two being provided on the center tank. As described above, each cartridge/canister fuel pump 110 may include an inside portion 122 essentially being internal to a respective fuel tank, and an outside portion 124 essentially extending externally from the fuel tank. The outside portion 124 includes portions of the cartridge, and particularly the motor assembly, so as to permit external access to the cartridge for removal and replacement.

The fuel system of the aircraft 100 further many include any suitable fuel system flow components generally referred to in FIG. 6 by reference numeral 126. The fuel system flow components 126 may includes various components that permit and control the fuel flow through the system from the fuel tanks to the engines, including for example, plumbing, shutoff valves, check valves and/or other associated valves, and ejector pumps or other secondary pumps. As seen in the flow pathways of the fuel system flow components 126, a portion of the cartridge/canister fuel pumps 110 may operate to provide fuel flow to the engines 128 and 130, or to transfer fuel among the fuel tanks. A portion of the cartridge/canister fuel pumps 110 also may operate as jettison fuel pumps to perform a fuel jettison function to expel fuel from the fuel tanks, which could be used to remove fuel for maintenance or to jettison fuel in emergency circumstances.

An aspect of the invention, therefore, is a cartridge/canister fuel pump. In exemplary embodiments, the cartridge/canister fuel pump includes a cartridge and a canister, the canister being configured to removably receive the cartridge, and the canister includes an inlet and an outlet for a flow of a fluid through the cartridge/canister fuel pump. The cartridge includes a motor assembly and a pump assembly, the pump assembly including a centrifugal pumping element and outlet porting from the centrifugal pumping element, wherein the motor drives the centrifugal pumping element to generate a flow of fluid through a main flow pathway between the inlet and the outlet through the outlet porting of the pump assembly. The cartridge further includes a pressure relief valve that is movable between a closed position and an open position, the pressure relief valve defining a pressure relief flow pathway integrally within the cartridge from the outlet porting to inlet porting of the centrifugal pumping element. When pressure within the pump assembly exceeds a threshold pressure, the pressure relief valve moves from the closed position to the open position to permit a relief flow of fluid through the relief flow pathway. The cartridge/canister fuel pump may include one or more of the following features, either individually or in combination.

In an exemplary embodiment of the cartridge/canister fuel pump, the pressure relief valve comprises a movable element that is movable between the closed position and the open position, an elastic element that biases the movable element in the closed position, and at least one relief port that fluidly connects the outlet porting and the inlet porting of the centrifugal pumping element. When pressure within the pump assembly exceeds the threshold pressure, the movable element moves from the closed position to the open position to permit the relief flow of fluid from the outlet porting, through the relief port, to the inlet porting of the centrifugal pumping element.

In an exemplary embodiment of the cartridge/canister fuel pump, the pump assembly comprises a pump housing that includes a throat that houses the centrifugal pumping element.

In an exemplary embodiment of the cartridge/canister fuel pump, the pump housing has a valve seat, and in the closed position the elastic element biases the movable element against the valve seat.

In an exemplary embodiment of the cartridge/canister fuel pump, the guide pins have a step that limits movement of the movable element in the open position, the movable element being movable with a stroke space defined between the valve seat and the ridge.

In an exemplary embodiment of the cartridge/canister fuel pump, the elastic element comprises at least one spring.

In an exemplary embodiment of the cartridge/canister fuel pump, the movable element comprises a valve disc shaped as an annular ring that extends around an outer diameter of the throat, wherein the movable element moves between the closed position and the open position along the outer diameter of the throat.

In an exemplary embodiment of the cartridge/canister fuel pump, the movable element comprises a poppet including a base and an axial guide extending from the base, wherein the axial guide runs along an outer diameter of the throat when the movable element moves between the closed position and the open position.

In an exemplary embodiment of the cartridge/canister fuel pump, the centrifugal pumping element is configured as a two stage pumping element (should not limit this to a two stage design) comprising an impeller and an inducer positioned upstream relative to the impeller.

In an exemplary embodiment of the cartridge/canister fuel pump, the outlet porting is an outlet for fluid flow from the impeller, and the inlet porting is an inlet for fluid flow to the inducer.

In an exemplary embodiment of the cartridge/canister fuel pump, the inlet of the canister comprises an inlet cover defining an inlet flow path, and a gate valve configured to control a flow of fluid into the cartridge.

In an exemplary embodiment of the cartridge/canister fuel pump, the outlet of the canister comprises a discharge cover defining an outlet flow path, and a check valve configured to control a flow of fluid from the cartridge.

Another aspect of the invention is a cartridge for use in a cartridge/canister fuel pump, wherein the cartridge is configured to be removably received within a canister of the cartridge/canister fuel pump. In exemplary embodiments, the cartridge includes a motor assembly and a pump assembly, the pump assembly including a centrifugal pumping element and outlet porting from the centrifugal pumping element, wherein the motor drives the centrifugal pumping element to generate a flow of fluid through a main flow pathway between the inlet and the outlet through the outlet porting of the pump assembly. A pressure relief valve is movable between a closed position and an open position, the pressure relief valve defining a pressure relief flow pathway integrally within the cartridge from the outlet porting to inlet porting of the centrifugal pumping element. When pressure within the pump assembly exceeds a threshold pressure, the pressure relief valve moves from the closed position to the open position to permit a relief flow of fluid through the relief flow pathway. The cartridge may include one or more of the following features, either individually or in combination.

In an exemplary embodiment of the cartridge, the pressure relief valve includes a movable element that is movable between the closed position and the open position, an elastic element that biases the movable element in the closed position, and at least one relief port that fluidly connects the outlet porting and the inlet porting of the centrifugal pumping element. When pressure within the pump assembly exceeds the threshold pressure, the movable element moves from the closed position to the open position to permit the relief flow of fluid from the outlet porting, through the relief port, to the inlet porting of the centrifugal pumping element.

In an exemplary embodiment of the cartridge, the pump assembly comprises a pump housing that includes a throat that houses the centrifugal pumping element.

In an exemplary embodiment of the cartridge, the pump housing has a valve seat, and in the closed position the elastic element biases the movable element against the valve seat.

In an exemplary embodiment of the cartridge, the guide pins include a step that limits movement of the movable element in the open position, the movable element being movable with a stroke space defined between the valve seat and the guide pin steps.

In an exemplary embodiment of the cartridge, the elastic element comprises at least one spring.

In an exemplary embodiment of the cartridge, the movable element comprises a valve disc shaped as an annular ring that extends around an outer diameter of the throat, wherein the movable element moves between the closed position and the open position along the outer diameter of the throat.

In an exemplary embodiment of the cartridge, the movable element comprises a poppet including a base and an axial guide extending from the base, wherein the axial guide runs along an outer diameter of the throat when the movable element moves between the closed position and the open position.

In an exemplary embodiment of the cartridge, the centrifugal pumping element is configured as a two stage pumping element comprising an impeller and an inducer positioned upstream relative to the impeller.

In an exemplary embodiment of the cartridge, the outlet porting is an outlet for fluid flow from the impeller, and the inlet porting is an inlet for fluid flow to the inducer.

Another aspect of the invention is a fuel pump configured to be mounted through a fuel tank wall. In exemplary embodiments, the fuel pump includes an outside portion, an inside portion, and a mounting plate that separates the inside portion from the outside portion, wherein the mounting plate is configured to mount the fuel pump to the fuel tank wall such that the outside portion is located externally of the fuel tank and the inside portion is located internally within the fuel tank. The outside portion includes a motor assembly. The inside portion includes a canister that includes an inlet and an outlet for the flow of a fluid through the fuel pump; a pump assembly, the pump assembly including a centrifugal pumping element and outlet porting from the centrifugal pumping element, wherein the motor drives the centrifugal pumping element to generate a flow of fluid through a main flow pathway between the inlet and the outlet through the outlet porting of the pump assembly; and a pressure relief valve that is movable between a closed position and an open position, the pressure relief valve defining a pressure relief flow pathway integrally within the pump assembly from the outlet porting to inlet porting of the centrifugal pumping element. When pressure within the pump assembly exceeds a threshold pressure, the pressure relief valve moves from the closed position to the open position to permit a relief flow of fluid through the relief flow pathway. The fuel pump may include one or more of the following features, either individually or in combination.

In an exemplary embodiment of the fuel pump, the motor assembly, pump assembly, and pressure relief valve comprise a cartridge that is removably received through the mounting plate by the canister.

In an exemplary embodiment of the fuel pump, the pressure relief valve includes a movable element that is movable between the closed position and the open position, an elastic element that biases the movable element in the closed position, and at least one relief port that fluidly connects the outlet porting and the inlet porting of the centrifugal pumping element. When pressure within the pump assembly exceeds the threshold pressure, the movable element moves from the closed position to the open position to permit the relief flow of fluid from the outlet porting, through the relief port, to the inlet porting of the centrifugal pumping element.

In an exemplary embodiment of the fuel pump, the pump assembly comprises a pump housing that includes a throat that houses the centrifugal pumping element.

In an exemplary embodiment of the fuel pump, the pump housing has a valve seat, and in the closed position the elastic element biases the movable element against the valve seat.

In an exemplary embodiment of the fuel pump, the throat includes a ridge that limits movement of the movable element in the open position, the movable element being movable with a stroke space defined between the valve seat and the ridge.

In an exemplary embodiment of the fuel pump, the elastic element comprises at least one spring.

In an exemplary embodiment of the fuel pump, the movable element comprises a valve disc shaped as an annular ring that extends around an outer diameter of the throat, wherein the movable element moves between the closed position and the open position along the outer diameter of the throat.

In an exemplary embodiment of the fuel pump, the movable element comprises a poppet including a base and an axial guide extending from the base, wherein the axial guide runs along an outer diameter of the throat when the movable element moves between the closed position and the open position.

In an exemplary embodiment of the fuel pump, the centrifugal pumping element is configured as a two stage pumping element comprising an impeller and an inducer positioned upstream relative to the impeller.

In an exemplary embodiment of the fuel pump, the outlet porting is an outlet for fluid flow from the impeller, and the inlet porting is an inlet for fluid flow to the inducer.

In an exemplary embodiment of the fuel pump, the inlet of the canister comprises an inlet cover defining an inlet flow path, and a gate valve configured to control a flow of fluid into the cartridge.

In an exemplary embodiment of the fuel pump, the outlet of the canister comprises a discharge cover defining an outlet flow path, and a check valve configured to control a flow of fluid from the cartridge.

An aircraft, therefore, may include at least one engine, at least one fuel tank, fuel system flow components configured to control a flow of fuel from the fuel tank to the engine, and a cartridge/canister fuel pump including a cartridge and/or fuel pump in accordance with any of the above embodiments. The cartridge/canister fuel pump fuel pump is mounted to a wall of the fuel tank such that a portion of the cartridge extends externally from the fuel tank.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cartridge/canister fuel pump comprising:
a cartridge and a canister, the canister being configured to removably receive the cartridge, and the canister includes an inlet and an outlet for a flow of a fluid through the cartridge/canister fuel pump;
the cartridge comprising a motor assembly and a pump assembly, the pump assembly including a centrifugal pumping element and outlet porting from the centrifugal pumping element, wherein the motor assembly drives the centrifugal pumping element to generate a flow of fluid through a main flow pathway between the inlet and the outlet through the outlet porting of the pump assembly; and
the cartridge further comprising a pressure relief valve that is movable between a closed position and an open position, the pressure relief valve defining a pressure relief flow pathway integrally within the cartridge from the outlet porting to inlet porting of the centrifugal pumping element;
wherein when pressure within the pump assembly exceeds a threshold pressure, the pressure relief valve moves from the closed position to the open position to permit a relief flow of fluid through the relief flow pathway.

2. The cartridge/canister fuel pump of claim 1, wherein the pressure relief valve comprises:
a movable element that is movable between the closed position and the open position;
an elastic element that biases the movable element in the closed position; and
at least one relief port that fluidly connects the outlet porting and the inlet porting of the centrifugal pumping element;
wherein when pressure within the pump assembly exceeds the threshold pressure, the movable element moves from the closed position to the open position to permit the relief flow of fluid from the outlet porting, through the relief port, to the inlet porting of the centrifugal pumping element.

3. The cartridge/canister fuel pump of claim 2, wherein the pump assembly comprises a pump housing that includes a throat that houses the centrifugal pumping element.

4. The cartridge/canister fuel pump of claim 3, wherein the pump housing has a valve seat, and in the closed position the elastic element biases the movable element against the valve seat.

5. The cartridge/canister fuel pump of claim 4, wherein the elastic element is supported by guide pins that have a step that limits movement of the movable element in the open position, the movable element being movable with a stroke space defined between the valve seat and the guide pin steps.

6. The cartridge/canister fuel pump of claim 2, wherein the elastic element comprises at least one spring.

7. The cartridge/canister fuel pump of claim 3, wherein the movable element comprises a valve disc shaped as an annular ring that extends around an outer diameter of the throat, wherein the movable element moves between the closed position and the open position along the outer diameter of the throat.

8. The cartridge/canister fuel pump of claim 3, wherein the movable element comprises a poppet including a base and an axial guide extending from the base, wherein the axial guide runs along an outer diameter of the throat when the movable element moves between the closed position and the open position.

9. The cartridge/canister fuel pump of claim 1, wherein the centrifugal pumping element is configured as a two stage pumping element comprising an impeller and an inducer positioned upstream relative to the impeller.

10. The cartridge/canister fuel pump of claim 9, wherein the outlet porting is an outlet for fluid flow from the impeller, and the inlet porting is an inlet for fluid flow to the inducer.

11. The cartridge/canister fuel pump of claim 1, wherein the inlet of the canister comprises an inlet cover defining an inlet flow path, and a gate valve configured to control a flow of fluid into the cartridge.

12. The cartridge/canister fuel pump of claim 1, wherein the outlet of the canister comprises a discharge cover defining an outlet flow path, and a check valve configured to control a flow of fluid from the cartridge.

13. A cartridge for use in a cartridge/canister fuel pump, wherein the cartridge is configured to be removably received within a canister of the cartridge/canister fuel pump, the cartridge comprising:
a motor assembly and a pump assembly, the pump assembly including a centrifugal pumping element and outlet porting from the centrifugal pumping element, wherein the motor assembly drives the centrifugal pumping element to generate a flow of fluid through a main flow pathway between an inlet and an outlet through the outlet porting of the pump assembly; and
a pressure relief valve that is movable between a closed position and an open position, the pressure relief valve defining a pressure relief flow pathway integrally within the cartridge from the outlet porting to inlet porting of the centrifugal pumping element;
wherein when pressure within the pump assembly exceeds a threshold pressure, the pressure relief valve moves from the closed position to the open position to permit a relief flow of fluid through the relief flow pathway.

14. The cartridge of claim 13, wherein the pressure relief valve comprises:
a movable element that is movable between the closed position and the open position;
an elastic element that biases the movable element in the closed position; and
at least one relief port that fluidly connects the outlet porting and the inlet porting of the centrifugal pumping element;
wherein when pressure within the pump assembly exceeds the threshold pressure, the movable element moves from the closed position to the open position to permit the relief flow of fluid from the outlet porting, through the relief port, to the inlet porting of the centrifugal pumping element.

15. The cartridge of claim 14, wherein the pump assembly comprises a pump housing that includes a throat that houses the centrifugal pumping element.

16. The cartridge of claim 15, wherein the pump housing has a valve seat, and in the closed position the elastic element biases the movable element against the valve seat.

17. The cartridge of claim 16, wherein the elastic element is supported by guide pins that include a step that limits movement of the movable element in the open position, the movable element being movable with a stroke space defined between the valve seat and the guide pin steps.

18. The cartridge of claim 14, wherein the elastic element comprises at least one spring.

19. The cartridge of claim 15, wherein the movable element comprises a valve disc shaped as an annular ring that extends around an outer diameter of the throat, wherein the movable element moves between the closed position and the open position along the outer diameter of the throat.

20. The cartridge of claim 15, wherein the movable element comprises a poppet including a base and an axial guide extending from the base, wherein the axial guide runs along an outer diameter of the throat when the movable element moves between the closed position and the open position.

21. The cartridge of claim 13, wherein the centrifugal pumping element is configured as a two stage pumping element comprising an impeller and an inducer positioned upstream relative to the impeller.

22. The cartridge of claim 21, wherein the outlet porting is an outlet for fluid flow from the impeller, and the inlet porting is an inlet for fluid flow to the inducer.

* * * * *